Dec. 3, 1963  J. A. KUECKEN  3,113,309
METHOD AND APPARATUS FOR MEASURING ALTITUDE
Filed May 4, 1959  2 Sheets-Sheet 1
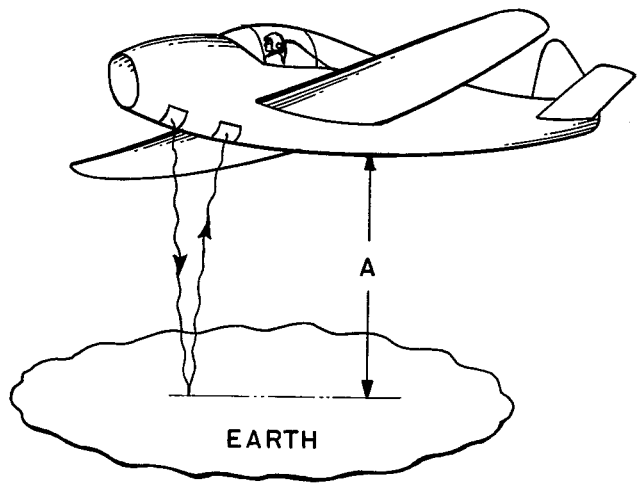
Fig. 1
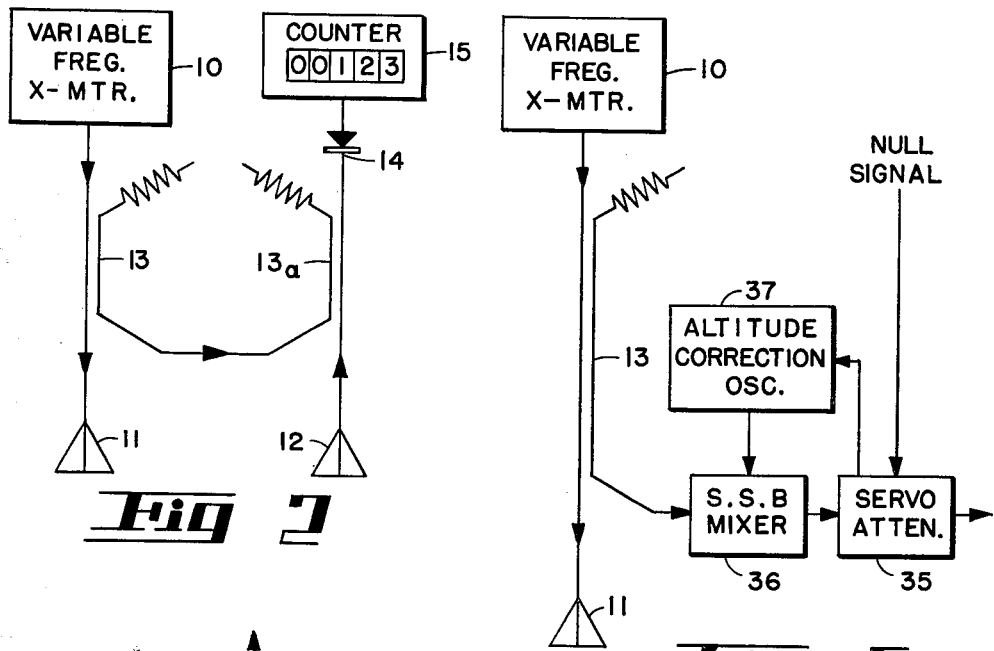
Fig. 2
Fig. 6
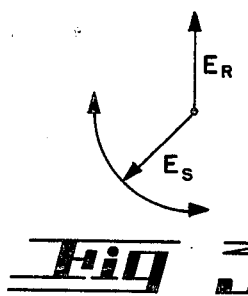
Fig. 3
INVENTOR.
JOHN A. KUECKEN.
BY Alden D. Redfield
Irwin P. Garfinkle
ATTORNEYS.

Dec. 3, 1963   J. A. KUECKEN   3,113,309
METHOD AND APPARATUS FOR MEASURING ALTITUDE
Filed May 4, 1959                                2 Sheets-Sheet 2

INVENTOR.
JOHN A. KUECKEN.
BY Alden D. Redfield
Irwin P. Garfinkle
ATTORNEYS.

# United States Patent Office 3,113,309
Patented Dec. 3, 1963

3,113,309
METHOD AND APPARATUS FOR MEASURING ALTITUDE
John A. Kuecken, Cincinnati, Ohio, assignor to Avco Corporation, Cincinnati, Ohio, a corporation of Delaware
Filed May 4, 1959, Ser. No. 810,739
2 Claims. (Cl. 343—14)

This invention relates generally to a highly accurate distance measuring device and, more particularly, to an altimeter capable of measuring the exact number of wavelengths in distance a signal travels between a transmitter and a target.

It is known that instrument landing systems for aircraft are required to have high degrees of accuracy for actual touchdown procedures, and in some circumstances the apparatus must be capable of rendering readings of altitude of only a few feet. By means of the method and apparatus of this invention, these results are accomplished by making a precise count of the actual number of wavelengths in the transmission and reflection paths of a wave.

Broadly, this invention describes a novel apparatus for very accurate distance or altitude measurement consisting of a variable frequency transmitter for transmitting a signal which is slowly varying in frequency, a receiver for receiving reflections of the transmitted signal, means for comparing the phase of the transmitted and received signals, and a computer for counting the number of interference cycles or nulls occuring within a given change in frequency. Broadly, the method disclosed by this invention comprises the steps of transmitting a signal having a frequency varying slowly between first and second limits $F_1$ and $F_2$ and comparing a portion of the transmitted signals with the reflected signals, the number of occasions when these signals are 180 degrees out of phase being a direct function of the distance of the transmitter from the reflecting surface.

It is an object of this invention to provide a method for measuring distance between a source of radiant energy and a reflecting object by determining the number of whole cycles in the wave transmitted from said source to said object.

Another object of this invention is to provide a method for measuring distance comprising the steps of transmitting radiant energy signals from a source to a distant reflecting object, varying the transmitted frequency between first and second limits, comparing the phase of the transmitted signals with signals reflected from the object back to the source, and counting each occurrence of the event when the reflected signal is 180 degrees out of phase with the transmitted signal, the total number of such occurrences being a direct function of the distance of the object from the source.

Still another object of this invention is to provide apparatus for accurately measuring the distance between a variable frequency source of radiant energy and a distant reflecting object.

Another object of this invention is to provide apparatus for very accurate distance measurement consisting of a variable frequency generator and a counter arranged to determine the number of interference cycles occurring between transmitted and reflected signals with a given change in frequency of the generator.

Further objects and a more complete understanding of the nature of this invention may be had by reference to the following detailed description and to the accompanying drawings, in which:

FIG. 1 diagrammatically illustrates the operation of my invention;

FIG. 2 is a simplified schematic representation of the apparatus used in accordance with my invention;

FIG. 3 illustrates the vector relationship of the transmitted and received signals; and FIGS. 4, 5 and 6 illustrate improved embodiments of my invention, including apparatus for producing nulls when the reference and reflected signals are 180 degrees out of phase.

Figure 4:
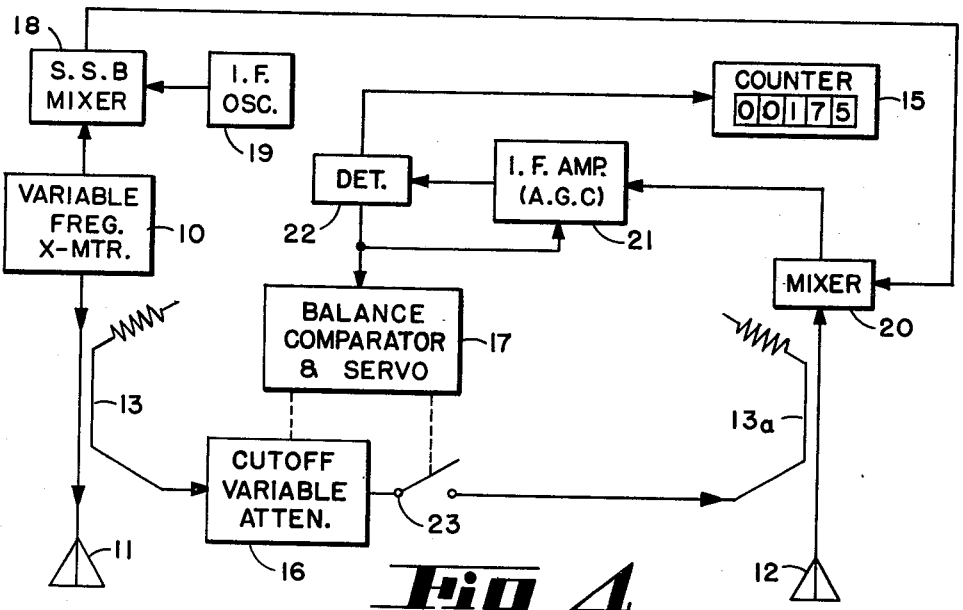

Referring now to FIG. 1 of the drawings, an aircraft, illustrated in level flight over the earth at an altitude A, is provided with a variable frequency transmitter and a receiver. It is known that for any given frequency, the altitude A between the aircraft and the earth is equal to an undetermined number of wavelengths L, and since the distance between the transmitter to the earth and back to the receiver is two times the altitude, then it follows mathematically that:

$$2A = nL$$

where $n$ = the total number of waves at a given frequency and $L$ = the wavelengths at that given frequency.

In order to determine the exact number ($n$) of wavelengths in the transmitted and reflected paths, I provide apparatus such as that diagrammatically shown in FIG. 2. This apparatus includes a transmitter 10, the frequency of which is swept at a relatively slow rate between two frequency limits $F_1$ and $F_2$, and the output of which is directed by means of a conventional radiator or antenna 11 toward earth. Reflected waves are picked up at a similar receiver antenna 12. Conventional directional couplers 13 and 13a combine a portion of the transmitter signal (a reference signal) with the reflected signal, and the combined signals are then applied to a diode detector 14. When the reference and reflected signals are in phase, the output from detector 14 is a maximum; when the transmitted and reflected signals are 180 degrees out of phase, the output of detector 14 is a minimum. The output of detector 14 is applied to a counter or computer 15 which counts the occurrence of each minimum.

As will be seen, the number of such occurrences when the transmitter reference signal at the coupler 13 and the reflected signal are 180 degrees out of phase, is equal to the change $\Delta n$ in the number of wavelengths in the path from the transmitter to earth and back to the receiver, as the transmitted frequency is varied from $F_1$ to $F_2$. This can be understood from a study of the vector diagram of FIG. 3 in which it is seen that the vector of the transmitted signal $E_s$ rotates as the frequency of the received or reflected signal $E_r$ is varied. That is to say, as the wavelength L is varied, due to variations in frequency of the transmitted signal, the phase relationship between the transmitted and received signals will rotate and will be precisely 180 degrees out of phase each time the round trip distance between the aircraft and earth is equal to a whole number of wavelengths. Thus, by algebraically adding the transmitted reference signal and the reflected signal, or by comparing the phase of the received signal with that of the reference signal as the transmission frequency is varied between predetermined limits, one is able to count the number of times the transmitted and received waves are 180 degrees out of phase. In other words, one is able to count the change $\Delta n$ in the number of wavelengths in the transmitted and reflected path of the signal. Knowing $\Delta n$, a solution is available for $n$.

Assuming that the transmitter varies slowly between frequencies $F_1$ and $F_2$ having wavelengths between $L_1$ and $L_2$, respectively, and assuming that $n$ equals the number of wavelengths in the path between the transmitter and the reflecting object (earth) and back to the receiver at frequency $F_1$, and also assuming that $\Delta n$ is equal to the change in the number of wavelengths between the transmitted and reflecting object as the frequency is varied between $F_1$ and $F_2$, then $$2A = nL_1 = (n + \Delta n)L_2$$

Solving for $n$, we get $$n = \frac{\Delta n L_2}{L_1 - L_2}$$

Thus, $$A = \frac{nL_1}{2} = \frac{\Delta n}{2}\left(\frac{L_1 L_2}{L_1 - L_2}\right) = \Delta n C$$

where $$C = \frac{L_1 L_2}{2(L_1 - L_2)}$$

a constant for any given range of frequencies $F_1$ and $F_2$.

Since C is constant, then A is a direct function of $\Delta n$, and by proper selection of the parameters $L_1$ and $L_2$, $\Delta n$ may be arranged to yield a direct reading in feet, meters, etc. For example, if $L_1$ is made equal to two feet and $L_2$ equal to one foot, then $C=1$, and $\Delta n$ will yield direct readings in feet.

In summary of the analysis of FIG. 1, what occurs is: At a given altitude (A) and between a set range of frequencies ($F_1$, $F_2$), there will be a certain number of frequencies at which transmitted and received signals will be 180 degrees out of phase. A counter 15 will count how many of these 180 degree phase differences occur while sweeping once through the set range of frequencies ($F_1$, $F_2$). This count is indicative of the present altitude. If the altitude varies, there will be a different number of frequencies wherein the transmitted and reflected waves will be 180 degrees out of phase and, therefore, a different count results.

While the apparatus described and illustrated in connection with FIG. 2 is fundamentally sound, it is operable for counting minima whereas counting nulls is more accurate and preferred. In accordance with established principles, it is known that reflected power from a transmitted wave of electromagnetic energy will vary inversely as the square of the range from the source to the reflecting target varies. This is in accordance with the following equation:

$$\frac{P_r}{P_o} = \frac{G^2 L^2 HIS}{(4\pi)^3 A^2} = \frac{GL^2 S}{(4\pi)^2 A^2}$$

where $A$ = altitude or range
$G$ = antenna gain
$P_o$ = transmitted power
$P_r$ = received power
$H$ = E-plane beamwidth
$I$ = H-plane beamwidth
$L$ = wavelength
$S$ = isotropic back scatter cross section per unit area.

It is recognized that when the disclosed apparatus is used as an altimeter for touchdown procedures at an airport runway, it must be capable of accurate operation within a rather wide range of altitudes. However, from the above equation it may be determined that for altitudes varying between 5 feet and 5,000 feet $P_r$ (received power) varies over a 60 db range and, thus, some mechanism must be employed to equalize the reflected and reference signals so that the counter is able to count nulls rather than minima.

As in FIG. 2, the apparatus illustrated in FIG. 4 includes the variable frequency transmitter 10, the transmitting radiator 11, the receiver antenna 12, the directional couplers 13 and 13a, and the counter 15. However, in the directional coupler line of FIG. 4 there is provided a cutoff variable attenuator 16 controlled by a balance comparator and servo system 17. As before, reference signals from the transmitter are combined with received signals by means of the directional couplers. However, by coupling the reference signal through the variable attenuator 16, the coupled power of the transmitter reference signal is reduced and the variable attenuator permits equalization of the signal to yield the desired nulls.

To provide increased sensitivity to the system, a superheterodyne receiver may be used. For this purpose I employ a single sideband mixer 18 to which are applied a portion of the output of transmitter 10 and the output of a fixed intermediate frequency oscillator 19. These act to provide a local oscillator signal which tracks the transmitter frequency with a fixed frequency difference. The output of mixer 18 is then applied to the first input of another mixer 20, the second input being supplied with the combined reflected and reference signals. Thus, the output from the mixer 20 is a fixed frequency which is amplified in a fixed frequency amplifier 21. The output from the fixed frequency amplifier 21 is then applied to a detector 22.

The output from the detector 22 is applied to the counter 15 which, if the system is adjusted properly, will count nulls. In addition, a portion of the detector output is also supplied to the amplifier 21 to provide a measure of automatic gain control, and to the balance comparator and servo 17 for regulating the attenuator 16.

The balance comparator and servo 17 is conventional and is designed to operate at a 3 db difference level. During the period when the transmitter signal is being swept from $F_1$ to $F_2$, the switch 23 in the directional coupler is closed and, hence, the signals applied to the mixer are the algebraic summation of the reflected and reference signals. During the period of frequency reset, that is, during the period when the frequency is being returned to $F_1$, the switch 23 is automatically opened and, thus, only the reflected signals are applied to the mixer 20. If, when the switch is opened, the power applied to mixer 20 is exactly equal to twice the power applied when the switch is closed, then the reflected and reference signals are equal. However, if during this period the balance comparator detects more than a 3 db decrease in power (more than half) this means the reference signal is too strong, and the servo system serves to increase the attenuation of the variable attenuator 16. On the other hand, if the balance comparator detects a change in power level of less than 3 db, this means the reference signal is too weak, and the servo system operates to decrease the amount of attenuation. This arrangement tends always to maintain the reflected and reference signals equal and permits the counter 15 to count nulls, thereby facilitating the counting operation by providing a well-defined "count" signal.

While the system illustrated in FIG. 4 is advantageous in that it operates on nulls, thereby facilitating the counting operation, it is capable of operation during only one-half of the time, since the switch 23 must be closed during either the increasing or decreasing portion of the frequency sweep. The embodiment illustrated in FIG. 5, to which reference is now made, overcomes this disadvantage.

Figure 5:
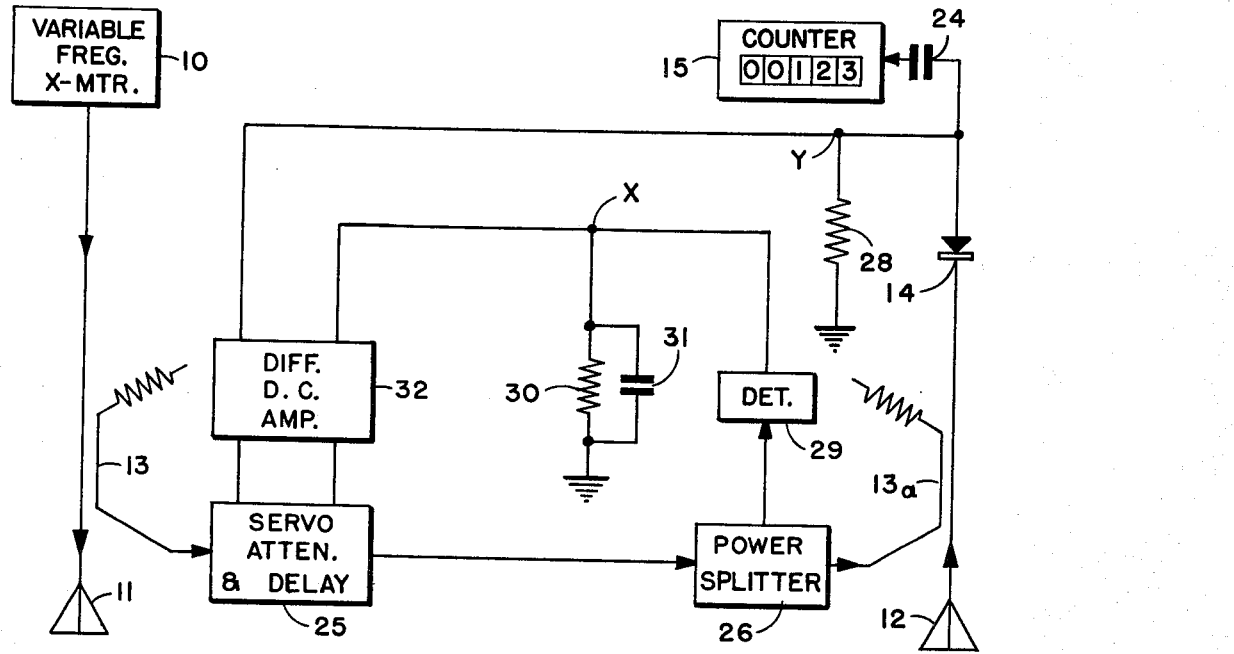

In addition, the embodiment of FIG. 5 also provides a means for compensating the change in frequency of the reference signal as the transmitter frequency is varied during the round trip time of the transmitted and reflected signals.

As in FIG. 2, the apparatus disclosed in FIG. 5 includes a variable frequency transmitter 10, a radiator 11, a receiving antenna 12, directional couplers 13 and 13a and a detector 14. A condenser 24 couples the output of detector 14 to the counter 15.

For the purpose of yielding a null output at the detector 14 for facilitating the counting operation at the counter 15, I provide in the line between the directional couplers 13 and 13a a servo attenuator and delay circuit 25 and a power splitter 26. The input to the circuit 25 is applied from the transmitter 10 through the directional coupler 13, and the output of circuit 25 is applied to the power splitter 26. Part of the power from the power splitter 26 is coupled through the directional coupler 13a to the detector 14 and across a resistor 28. The other part of the power output of the power splitter 26 is applied to a detector 29, the output of which is applied across parallel-connected resistor 30 and condenser 31.

The voltage between the junction X of detector 29 with resistor 30 and the junction Y of detector 14 with resistor 28 is then applied to a differential direct current amplifier 32, the output of which is used as a control input for the servo attenuator and time delay circuit 25.

As already noted, in order to obtain nulls at the output of detector 14, it is necessary that the power level of signals picked up at the antenna 12 (the reflected signals) and the power level of signals applied through the directional coupler 13a (the reference signals) be equal in magnitude. Now it will be recognized that if the power level of the signal applied to detector 29 is equal to twice that of the power level of the reference signal, then the voltage outputs from the detectors 14 and 29 will be equal when the power level of the reflected signal at the antenna 12 is equal to the power level of the reference signal at directional coupler 13a. Under these conditions the system will be capable of yielding nulls and thereby facilitate counting in the counter 15. Also, under these conditions it will be recognized that the voltage difference between the points X and Y will be zero and, hence, there will be a zero correction output from the differential direct current amplifier 32.

On the other hand, if the power level of the reflected signal is above or below the power level of the reference signal, then a voltage difference will exist between the points X and Y, and a correction voltage output will be produced from the amplifier 32. When applied to the servo amplifier and delay circuit 25, the amount of attenuation is varied in accordance with the output from the amplifier 32 to decrease or increase the attenuation of the signals applied from the directional coupler 13 to the directional coupler 13a, thus varying the power of the reference signal. In addition, the position of the servo attenuator 25 is also used to provide a time delay for the reference signal dependent on the magnitude of the return signal.

Previously it has been assumed that the rate of frequency variation of the transmitter is sufficiently slow that the reflected signal is at essentially the same frequency as the reference signal. For most practical applications such an assumption is accurate, and no corrections are required for the phase shift which occurs as a result of the variations in transmitted frequency during the round trip time of the transmitted and reflected signals. If for a very fast frequency sweep such a correction is required, it is available with the apparatus illustrated in FIG. 5. That is to say, since the position of the servo attenuator 25 represents the difference in power levels between the reflected and reference signals, and since this difference represents range, the output of the amplifier 32 may be used to control a time delay network to shift the phase of the reference signals in an amount required to compensate for the round trip time of the transmitted and reflected waves. That is to say, the circuit 25 includes a conventional delay device which serves to delay the reference signal from the coupler 13 by an amount equal to the round trip time of the transmitted signal.

It will also be recognized that if analog range information is desired, such information is available at the output of the servo attenuator 25.

FIG. 6 illustrates still another modification of this invention for obtaining the necessary phase correction of the reference signal. The apparatus of FIG. 6, which is a partial illustration of the system, includes a servo attenuator 35 which is provided with the necessary null power signal for producing the proper correction by any suitable means, such as shown in FIGS. 4 and 5. The phase correction is achieved by use of a single sideband mixer 36 having a first input supplied with a portion of the transmitted signal derived from the directional coupler 13. This signal is then heterodyned in the single sideband mixer 36 with the output of a variable frequency correction oscillator 37 to provide a reference signal, the frequency of which must be identical with the received signal. Because of the fact that the output of the servo attenuator is proportional to range, due to the fact that a range correction has been applied to it, its output is also proportional to phase shift. Thus, by applying a portion of the servo attenuator output to the frequency control input circuit of the altitude correction oscillator 37, the frequency of the oscillator 37 may be automatically adjusted so as to provide the necessary time delay between the reference and reflected signals for any given range to a target.

While several preferred embodiments of this invention have been disclosed, many modifications and adaptations will at once become apparent. For example, various other methods are available for maintaining a portion of the combined reference and reflected signals substantially equal to obtain nulls. Furthermore, while directional couplers have been suggested and are preferred for combining the reference and reflected signals, this method is not necessary to the operation of the apparatus, and any loose coupling means providing proper channel isolation may be used. For example, a lossy pad arrangement, such as is frequently used for coupling local oscillator power in a microwave mixer, may be used. It is intended, therefore, that this invention be limited only by the scope of the appended claims as interpreted in the light of the prior art.

What is claimed is:

1. The method of determining the distance between a source of electromagnetic energy and a distant reflecting station comprising the steps of:
    sweeping the frequency of said electromagnetic energy source over the entire range of frequencies between first and second arbitrarily selected, precisely known limits, the rate of said sweeping being relatively slow with respect to the round-trip transit time of a radiated electromagnetic wave between said source and said distant reflecting station;
    transmitting electromagnetic energy signals from said source to said distant reflecting station;
    receiving reflected electromagnetic energy signals from said reflecting station;
    deriving reference signals from said electromagnetic energy source;
    delaying said reference signals an amount of time equal to said round-trip transit time to eliminate the difference in frequency between said received electromagnetic energy signals and said reference signals due to said round-trip transit time;
    comparing the phase of said delayed reference signals with said received electromagnetic energy signals during the period of sweeping the frequency of said source over said range of frequencies; and counting each occurrence of the event when the received electromagnetic reflected energy signals are 180 degrees out of phase with said reference signals during said period of sweeping of the frequency of said source between said range of frequencies.

2. The invention as defined in claim 1 and including the step of attenuating said reference signals in response to the power level of said reflected electromagnetic energy signals to maintain said reference signals and said reflected signals at substantially equal power levels.

References Cited in the file of this patent

UNITED STATES PATENTS

| | | |
|---|---|---|
| 1,756,462 | Jenkins | Apr. 29, 1930 |
| 1,987,588 | Drake | Jan. 8, 1935 |
| 2,045,071 | Espenschied | June 23, 1936 |
| 2,147,810 | Alford | Feb. 21, 1939 |
| 2,151,323 | Hollmann | Mar. 21, 1939 |
| 2,520,553 | Lawson | Aug. 29, 1950 |
| 2,837,736 | Golay | June 3, 1958 |

FOREIGN PATENTS

| | | |
|---|---|---|
| 753,058 | Great Britain | July 18, 1956 |